United States Patent
Olson (10) Patent No.: US 11,317,596 B2
(45) Date of Patent: May 3, 2022

(54) TOWER SCREEN DUAL SURFACE FINISH

(71) Applicant: Tetra Laval Holdings & Finance S.A., Pully (CH)

(72) Inventor: Michael Olson, Montrose, MN (US)

(73) Assignee: Tetra Laval Holdings & Finance S.A., Pully (CH)

( * ) Notice: Subject to any disclaimer, the term of this patent is extended or adjusted under 35 U.S.C. 154(b) by 321 days.

(21) Appl. No.: 16/232,397

(22) Filed: Dec. 26, 2018

(65) Prior Publication Data

US 2020/0205367 A1 Jul. 2, 2020

(51) Int. Cl.
| | |
|---|---|
| *A01J 25/13* | (2006.01) |
| *A23C 19/068* | (2006.01) |
| *A47J 9/00* | (2006.01) |

(52) U.S. Cl.
CPC ........... *A01J 25/13* (2013.01); *A23C 19/0688* (2013.01); *A47J 9/002* (2013.01); *A47J 9/007* (2013.01)

(58) Field of Classification Search
CPC . A01J 25/112; A01J 25/13; A01J 25/12; A01J 25/00; A01J 25/002; A01J 25/008; A23C 19/0688; A47J 9/002; A47J 9/007
USPC ......... 99/454, 456, 458, 459, 452, 455, 460, 99/465
See application file for complete search history.

(56) References Cited

U.S. PATENT DOCUMENTS

| | | | |
|---|---|---|---|
| 4,676,475 A * | 6/1987 | Grandin | A23C 19/0285 249/105 |
| 4,942,052 A | 7/1990 | Posdal | |
| 6,180,153 B1 | 1/2001 | Palus | |
| 6,324,968 B2 * | 12/2001 | Hoogland | A01J 25/112 99/454 |
| 2018/0325072 A1* | 11/2018 | Fischer | A01J 25/112 |

FOREIGN PATENT DOCUMENTS

| | | | | |
|---|---|---|---|---|
| EP | 0 818 140 A1 | 1/1998 | | |
| EP | 1151663 A1 | 11/2001 | | |
| EP | 1 232 686 A1 | 8/2002 | | |
| EP | 1232686 B1 * | 4/2005 | | A01J 25/12 |
| EP | 3241432 A1 * | 11/2017 | | A01J 25/112 |
| FR | 2933270 A1 * | 1/2010 | | A01J 25/13 |

OTHER PUBLICATIONS

"The Influence of the Contact Surface Roughness on the Static Friction Coefficient" B. Ivkovic Tribology in Industry, vol. 22, No. 3&4 2000 (Year: 2000).*
Extended European Search Report for corresponding EP Application No. 19216641.1 dated May 27, 2020.

* cited by examiner

*Primary Examiner* — Ibrahime A Abraham
*Assistant Examiner* — Chris Q Liu
(74) *Attorney, Agent, or Firm* — Renner, Otto, Boisselle & Sklar, LLP (57) ABSTRACT

A block former (1) for the production of blocks of cheese (19) includes an upright drainage column (2) having a feed opening (3) for curd particles (4) at an upper end (5) of the drainage column (2). The drainage column (2) includes an inner wall (6) having an interior surface (7) against which a pillar of curd (8) formed of the curd particles (4) slides as the pillar of curd (8) moves downwardly through the drainage column (2). The upright drainage column (2) is divided into an upper part (9) and a lower part (10). The interior surface (7) at the upper part (9) has a first finish and the interior surface (7) at the lower part (10) has a second finish that provides higher friction with the pillar of curd (8) relative to the first finish.

15 Claims, 8 Drawing Sheets

TOWER SCREEN DUAL SURFACE FINISH

TECHNICAL FIELD

The invention relates to a method and system for producing blocks of cheese, where a block former having an upright drainage column is used to form cheese from a pillar of cheese curd.

TECHNICAL BACKGROUND

Different types of cheese may be produced using different types of production processes. In one exemplary production process, a final treatment of the cheese curd that has been formed from a milk raw material may include using a block former for producing well-formed uniform blocks of cheese. Curd particles that are in the form of cubes, slices, and flakes, which are conventionally referred to as curd chips, are drawn by a vacuum to a top of the block former tower or column. The tower is filled with the particles of curd and the curd begins to fuse into a continuous columnar mass or pillar. A vacuum is applied to the column for removing whey and air from the curd to form the cheese. After the pillar of curd has descended through the block former tower over a predetermined distance, a lower portion of the pillar of curd is severed with a cutting tool, such as a guillotine blade. Regular blocks of identical or nearly identical size are automatically cut and ejected from the block former for conveying to a vacuum sealing unit located downstream along the cheese production line.

Current block formers successfully produce blocks of cheddar-type cheeses. However, producing blocks of non-cheddar cheeses, such as cheeses having low-moisture, high salt content, or low-fat content, or cheddar cheeses that have low-moisture or a reduced fat content may be difficult using the current block formers due to a lack of fuseability of the cheese that causes undesirable cracks in the blocks of the cheese. Additionally, a lower portion of the curd may prematurely separate from the upper portion of the curd pillar.

SUMMARY

It is an object of the invention to at least partly overcome one or more limitations of the prior art. In particular, it is an object to provide a block former that is configured to produce well-formed blocks of cheese that have at least one of a high salt content, low-fat content, or low moisture as compared with standard cheddar cheese that is produced by conventional block formers.

According to an aspect of the invention, a block former for the production of blocks of cheese includes an upright drainage column having a feed opening for curd particles at an upper end of the drainage column. The drainage column includes an inner wall having an interior surface against which a pillar of curd formed of the curd particles slides as the pillar of curd moves downwardly through the drainage column. The upright drainage column is divided into an upper part and a lower part. The interior surface at the upper part has a first finish and the interior surface at the lower part has a second finish that provides higher friction with the pillar of curd relative to the first finish.

The block former described herein is advantageous in that the upper part of the drainage column enables an upper portion of the pillar of curd to descend through the drainage column, or fall more quickly as compared with a lower portion of the pillar of curd descending through the lower part of the drainage column. In contrast, conventional block formers have a uniform interior surface finish throughout the drainage column such that the entire pillar of curd descends at a same rate. Advantageously, the block former described herein enables a greater fuseability of the pillar of curd as the pillar of curd travels through the drainage column. The bottom of the pillar of curd does not prematurely separate from the top of the pillar of curd and the forming of cracks is also prevented to a greater extent. Accordingly, the block former may advantageously be used to produce blocks of cheese having higher salt content, lower fat content, or lower moisture as compared with the blocks of cheese produced by conventional block formers.

According to another aspect of the invention, a method of producing blocks of cheese by using the block former described herein may include feeding curd particles at an upper end of the drainage column, allowing the curd particles to form a pillar of curd that moves downwardly through the drainage column, gradually compacting the pillar of curd to form cheese at a lower end of the block former, and cutting off blocks of cheese at the lower end of the block former.

Although various aspects of the invention are set out in the accompanying independent claims, other aspects of the invention may include any combination of features from the disclosure and/or the accompanying dependent claims with the features of the independent claims, and not only the combinations explicitly set out in the accompanying claims.

BRIEF DESCRIPTION OF THE DRAWINGS

Features of the invention will now be described, by way of example, with reference to the accompanying schematic drawings, where.

DETAILED DESCRIPTION

The method and system according to the present invention has particular application in a block former for producing blocks of cheese, such as cheeses that have higher salt content, lower fat content, or lower moisture as compared with standard cheddar cheeses. Examples of types of cheese that may be formed using the block former include parmesan, asiago, and non-standard cheddar cheeses such as reduced fat cheddar, and low-moisture cheddar. The block former may be suitable to produce other types of cheese. The blocks of cheese produced by the block former may have at least one of a weight percent of moisture that is equal to or less than 31%, a weight percent of salt content that is equal to or greater than 2%, or a weight percent of fat content that is equal to or less than 25%.

The method and system use a block former or tower that has an upright drainage column being divided into an upper part and a lower part. The drainage column has an inner wall against which a pillar of curd formed of cheese curd particles slides as the pillar of curd moves downwardly through the drainage column to transform into cheese. The interior surface of the inner wall at the upper part of the drainage column has a first finish and the interior surface at the lower part of the drainage column has a second finish that has a higher coefficient of friction and provides higher friction with the pillar of curd. Due to less friction when in the lower part of the drainage column, the lower portion of the pillar of curd descends through the drainage column more slowly as compared with the upper portion of the pillar of curd. The upper portion of the pillar of curd accelerates more quickly toward the lower portion of the pillar of curd for better fusion of the pillar of curd that prevents separation of the lower portion from the upper portion. The improved fusion also prevents holes from being formed in the produced blocks of cheese.

Referring first to FIGS. 1-6, an exemplary block former 1 for producing blocks of cheese is shown. The block former 1 is arranged along a cheese production line to receive a mixture of cheese curd and whey at a location that is downstream from a location at which cheese curd is produced. The block former 1 is used to produce cheese. The block former 1 includes an upright drainage column 2 having a hopper or feed opening 3 for curd particles 4 at an upper end 5 of the drainage column 2. The curd particles 4 fed to the block former 1 may be in the form of cubes, slices, or flakes, which are conventionally known as curd chips or stirred curd. The drainage column 2 includes an inner wall 6 having an interior surface 7 against which a pillar of curd 8 formed of the curd particles 4 slides as the pillar of curd 8 moves or descends downwardly through the drainage column 2, as will be described further below. The inner wall 6 may be formed of any suitable material. For example, the inner wall 6 may be formed of stainless steel.

Figure 1:
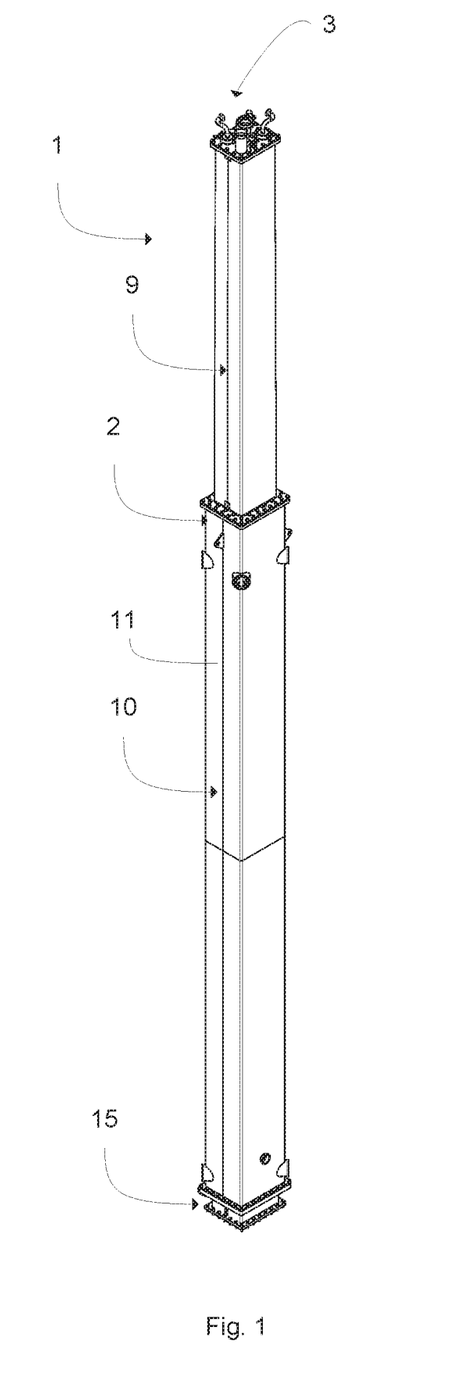
FIG. 1 is a perspective view of a block former for producing blocks of cheese.
Figure 2:
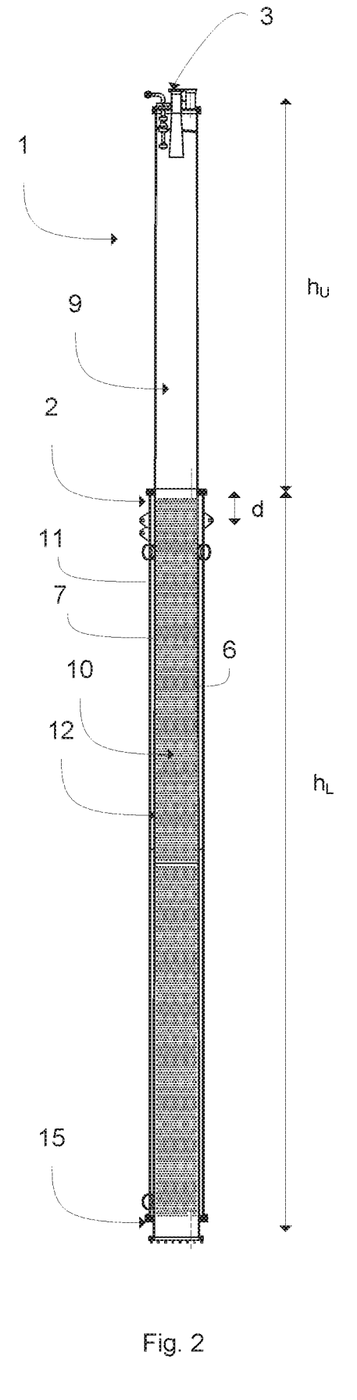
FIG. 2 is a sectional view of the block former shown in FIG. 1.
Figure 3:
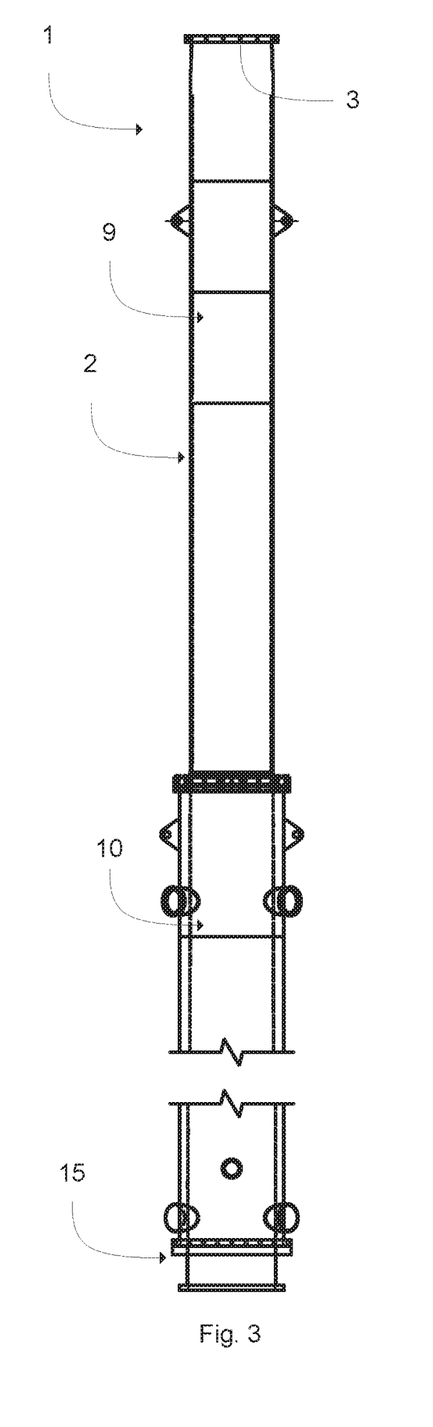
FIG. 3 is a side view of the block former shown in FIG. 1.
Figure 4:
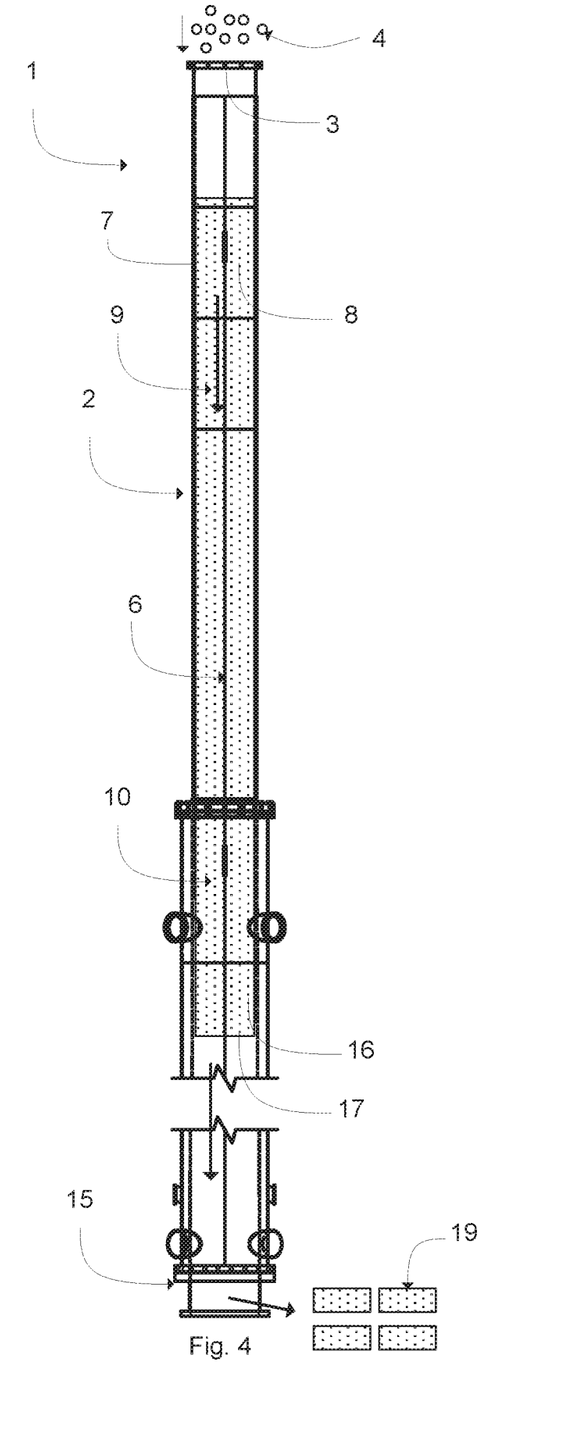
FIG. 4 is a sectional view of the block former shown in FIG. 3.
Figure 5:
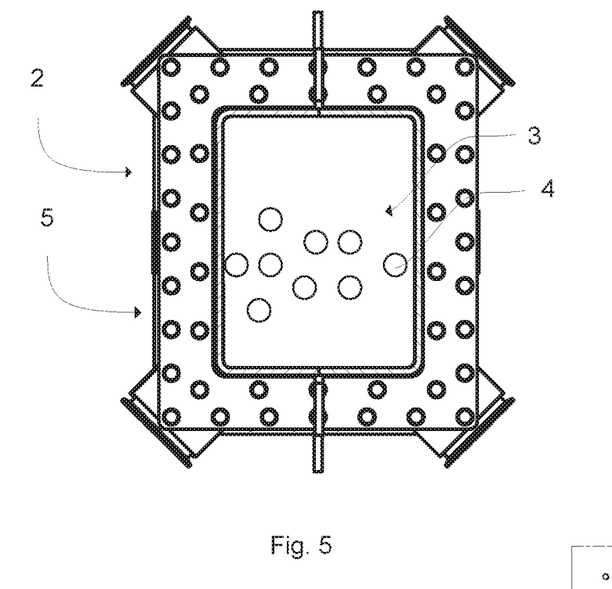
FIG. 5 is a top view of the block former shown in FIG. 1.
Figure 6:
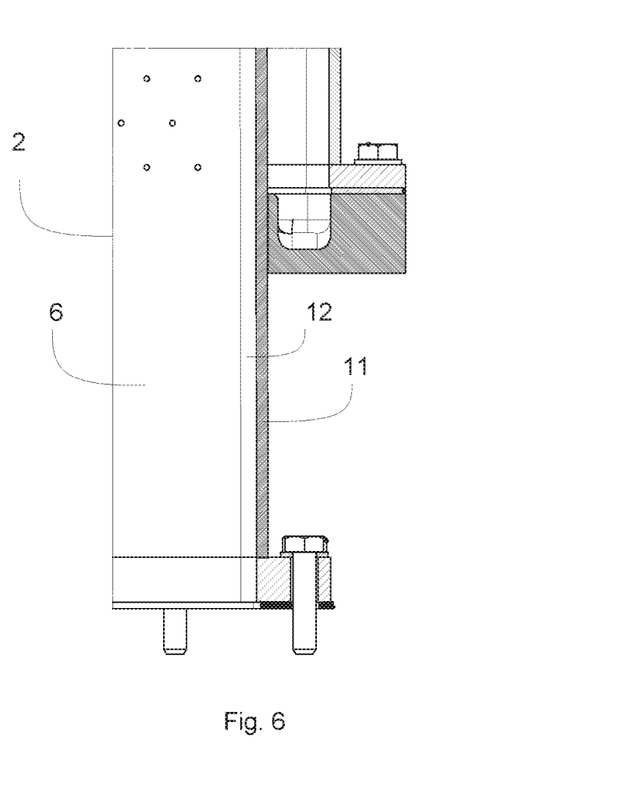
FIG. 6 is a detailed sectional view of the bottom of the block former shown in FIG. 1.

The drainage column 2 may be rectangular in shape and is divided into an upper part 9 and a lower part 10 that are vertically arranged relative to each other. The drainage column 2 may be round or rectangular-shaped to produce round-eyed blocks of cheese. The pillar of curd 8 fuses together in the upper part 9 and the lower part 10 may be perforated for draining the whey. The feed opening 3 is arranged at the upper end 5 of the upper part 9 of the drainage column 2 such that the pillar of curd 8 starts descending through the upper part 9 of the drainage column 2 toward the lower part 10. The lower part 10 of the drainage column 2 may form more than half of the drainage column 2. The lower part 10 may form between 60% and 70% of the drainage column 2. As shown in FIG. 2, a vertical height $h_L$ of the lower part 10 may be greater than a vertical height $h_U$ of the upper part 9. The upper part 9 may have an inner cross-sectional area that is less than an inner cross-sectional area of the lower part 10. The upper part 9 may transition into the lower part 10 over a distance d that is less than 10% of the height $h_U$ of the upper part 9. The distance d may be a portion of the drainage column 2 where the upper part 9 and the lower part 10 overlap.

The drainage column 2 is formed to enable a top portion of the pillar of curd 8 to fall or slide through the drainage column 2 at a rate that is greater than the rate of the bottom portion of the pillar of curd 8 enabling improved fuseability of the pillar of curd 8 as compared with conventional block formers. In the lower part 10 of the drainage column 2, the surface forces acting against the pillar of curd 8 in a direction normal to the pillar of curd 8 are higher as compared to the surface forces in the upper part 9 of the drainage column 2 due to the weight of the pillar of curd 8 and gravity. The drainage column 2 is formed to limit the sliding movement of the pillar of curd 8 in the lower part 10 of the drainage column 2 to prevent the bottom portion of the pillar of curd 8 from prematurely separating from the top portion of the pillar of curd 8 during the fusion of the pillar of curd 8.

Controlling the sliding movement of the pillar of curd 8 is achieved by providing at least two different finishes along the interior surface 7 of the drainage column 2. The interior surface 7 of the inner wall 6 at the upper part 9 of the drainage column 2 has a first finish and the interior surface 7 at the lower part 10 has a second finish that provides higher friction with the pillar of curd 8 relative to the first finish. The first finish may be formed along the entire area of the interior surface 7 at the upper part 9 of the drainage column 2 and the second finish may be formed along the entire area of the interior surface 7 at the lower part 10 of the drainage column 2. The second finish of the lower part 10 is formed to provide at least 15% higher friction against the pillar of curd 8 as compared with the first finish of the upper part 9 such that the sliding motion of the pillar of curd 8 in the upper part 9 is greater than the sliding motion of the pillar of curd 8 in the lower part 10.

The second finish at the lower part 10 that provides greater friction may be a shot-peened finish that is formed using a micropeening treatment process. Suitable materials for the micropeening treatment may include round glass beads or steel balls. The diameters of the beads or balls may be between 50 and 5000 micrometers. For example, balls having diameters of around 700 micrometers may be suitable for use. The second finish may have a surface roughness between 2.65 micrometers and 2.80 micrometers. Using micropeening is advantageous in that the process causes more rounded shapes, such as slopes and undulated surfaces, along the interior surface 7 which results in a reduction in the adhesion between the molecules of the curd particles 4 and the molecules of the interior surface 7, which may be formed of stainless steel. Accordingly, the static surface friction coefficient for the pillar of curd 8 sliding along the lower part 10 is lowered. The micropeening may be performed on the interior surface 7 at the lower part 10 when the interior surface 7 has a roughness that is less than 0.8 micrometers to increase the roughness. Using micropeening prevents the formation pits, crevices, and cracks in the produced cheese, providing a more hygienic surface that prevents bacteria from being lodged within the produced cheese.

The first finish at the upper part 9 that provides less friction is a smooth or polished finish that may be formed using a suitable grinding process. Other processes may also be suitable, such as brushing and polishing. The first finish may have a surface roughness that is less than the roughness of the second finish, such as between 0.75 micrometers and 0.90 micrometers. Providing two different finishes enables the top portion of the pillar of curd 8 to essentially free fall and remain in contact with the bottom portion of the pillar of curd 8 without separating and forming cracks in the produced block of cheese.

Figure 7:
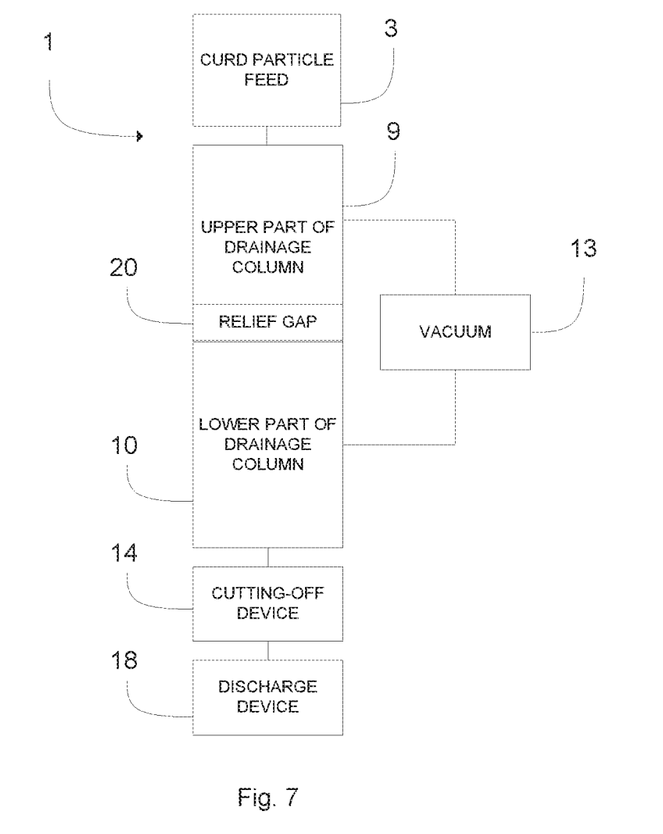
FIG. 7 is a schematic drawing of the block former shown in FIG. 1.

Referring in addition to FIG. 7, the block former 1 further includes a closed casing 11 that surrounds the inner wall 6 of the drainage column 2, and a vacuum device 13, as schematically shown in FIG. 7. The closed casing 11 has a greater cross-sectional area as compared with the cross-sectional area of the inner wall 6 such that a space 12 is defined between the casing 11 and the inner wall 6. The vacuum device 13 is connected to the space 12 for filling the drainage column 2 with the curd particles 4 via the feed opening 3 under reduced pressure. The block former 1 also includes a cutting-off device 14 located at the bottom end 15 of the lower part 10 of the drainage column 2, as schematically shown in FIG. 7. The cutting-off device 14 may be used to close the drainage column 2 and the cutting-off device 14 may be in the form of a horizontal guillotine blade. Any other suitable closing element may also be used. When the pillar of curd 8 has been transformed into a pillar of cheese 16, the cutting off device 14 is used to cut off a lower end 17 of the pillar of curd 8 from the remaining pillar of curd 8, as further described below. The block former 1 further includes a discharge device 18 used to discharge the block of cheese 19 from the block former 1 to be packaged and processed downstream.

Referring in addition to FIGS. 8-11, the block former 1 may include a relief gap 20 that is formed in the inner wall 6 at a location at which the upper part 9 of the drainage column 2 and the lower part 10 of the drainage column 2 meet, or at a base of the upper part 9. The relief gap 20 may thus be formed at the area in which the polished surface transitions to the micro-peened surface. Alternatively, the relief gap 20 is formed in the upper part 9 of the drainage column 2 or in the lower part 10 of the drainage column 2. Additional relief gaps may be provided at other locations along the drainage column 2. Providing the relief gap 20 is advantageous in preventing the pillar of curd 8 from adhering to the inner wall 6 of the drainage column 2, particularly in the upper part 9 of the drainage column 2 in which the particles of cheese curd 4 fuse together. When the particles of curd 4 are compressed into the feed opening 3, the particles of curd 4 are pushed against the inner wall 6. The pillar of curd 8 is lowered by releasing the vacuum created by the vacuum device 13 relative to the upper part 9 and the lower part 10 of the drainage column 2. The relief gap 20 is used to ensure that air enters the drainage column 2 to be supplied between the pillar of curd 8 and the inner wall 6.

Figure 8:
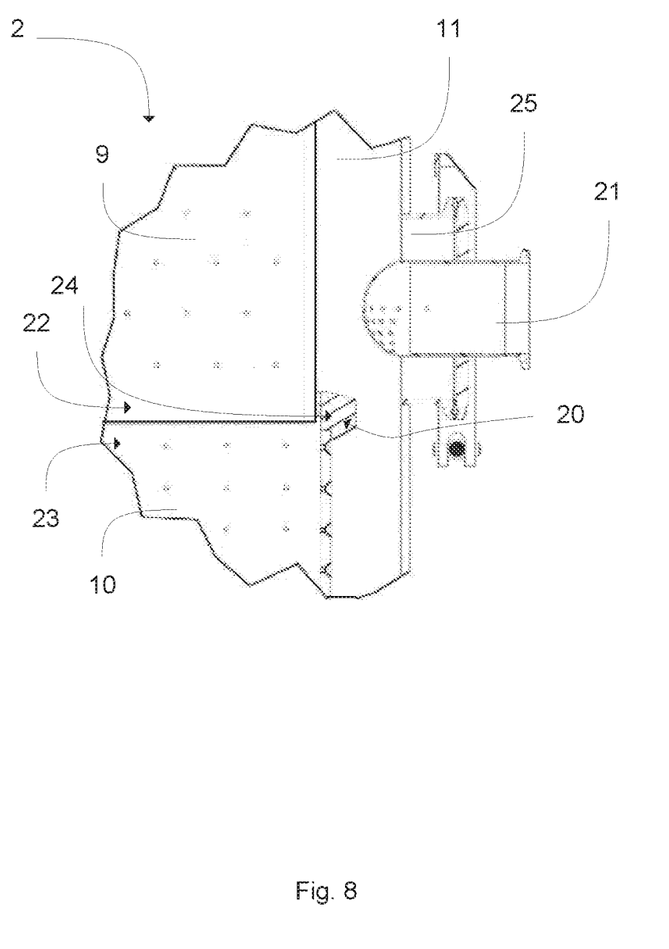
FIG. 8 is a detailed sectional view of a block former like the block former of FIG. 1 having a relief gap that is formed at a location at which the upper part of a drainage column and the lower part of the drainage column meet.

As shown in FIG. 8, a spray device 21, such as a clean in place (CIP) spray, may be provided for cleaning the relief gap 20 from contaminants. The CIP spray may include a rotatable or fixed spray ball. A bottom portion 22 of the upper part 9 of the drainage column 2 may be inserted into a top portion 23 of the lower part 10 of the drainage column 2 and the exemplary relief gap 20 may be formed in an area 24 in which the upper part 9 and the lower part 10 overlap.

The area 24 may also be an area in which the cross-sectional area of the drainage column 2 changes as the drainage column 2 transitions from the upper part 9 to the lower part 10. The spray device 21 may be attached to the drainage column 2 and configured to spray the area 24 in which the relief gap 20 is formed. The spray device 21 may be mounted to an exterior surface of the drainage column 2 using any suitable mount 25 and the spray device 21 may be arranged perpendicularly relative to the direction in which the drainage column 2 extends. The spray device 21 may be mounted at a location along the upper part 9 of the drainage column 2 and the spray device 21 may be arranged at a vertical height that is taller than the vertical height at which the area 24 is located.

Figure 9:
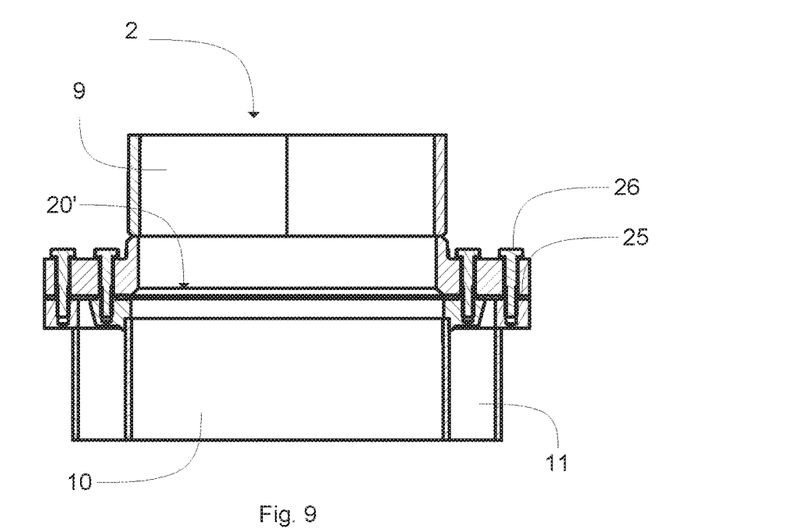
FIG. 9 is a sectional view of a block former like the block former of FIG. 1 having a relief gap that is gasketed.
Figure 10:
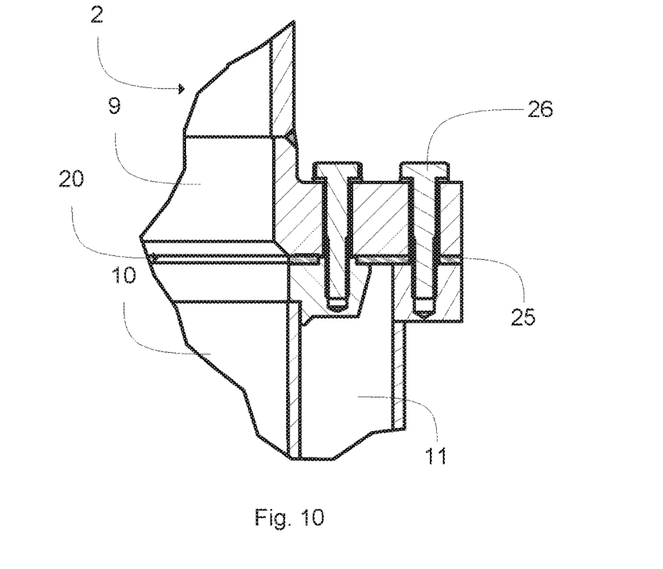
FIG. 10 is a detailed sectional view of the relief gap shown in FIG. 9.

As shown in FIGS. 9 and 10, a relief gap 20' may be formed between the upper part 9 and the lower part 10 such that the relief gap 20' is vertically interposed between the upper part 9 and the lower part 10. The relief gap 20' forms a step between the upper part 9 and the lower part 10. The cross-sectional area of the drainage column 2 changes as the drainage column 2 transitions from the upper part 9 to the lower part 10 along the relief gap 20'. The drainage column 2 includes at least one gasket 25 that is arranged adjacent the relief gap 20' in an area adjacent to the area in which the relief gap 20' is formed. The gasket 25 may be secured within the closed casing 11 using any suitable fastening mechanism 26. Using the gasket 25 is advantageous in that the cleanliness of the relief gap 20' is easily maintained since the relief gap 20' is sealed relative to outside of the drainage column 2. The gasket 25 may be removable for cleaning the relief gap 20'.

Figure 11:
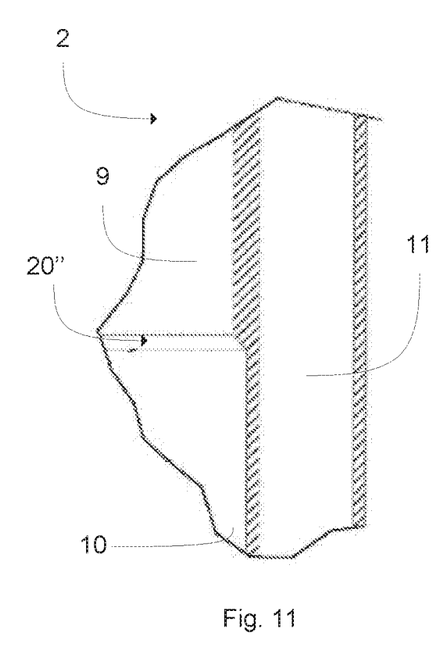
FIG. 11 is a sectional view of a block former like the block former of FIG. 1 having a relief gap that is formed as a step between the upper part of a drainage column and the lower part of the drainage column.
Figure 12:
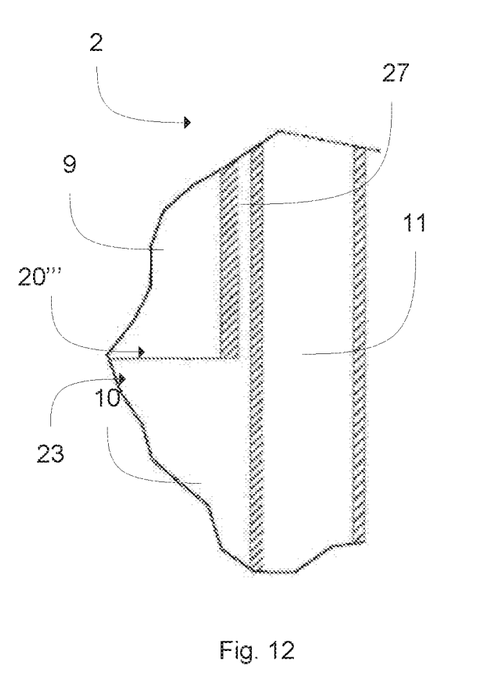
FIG. 12 is a sectional view of a block former like the block former of FIG. 1 in which the drainage column includes a fully inserted sleeve that extends downwardly from the upper part of the drainage column and past the top portion of the lower part of the drainage column.

As shown in FIG. 11, a relief gap 20" may be formed between the upper part 9 and the lower part 10 such that the relief gap 20" is vertically interposed between the upper part 9 and the lower part 10 such that the relief gap 20" is formed as a step between the upper part 9 and the lower part 10. The cross-sectional area of the drainage column 2 changes as the drainage column 2 transitions from the upper part 9 to the lower part 10 along the relief gap 20". The upper part 9 of the drainage column 2 is secured or welded to the lower part 10 within the closed casing 11 such that the relief gap 20" is prevented from exposure to outside of the drainage column 2. Welding the upper part 9 and the lower part 10 may eliminate use of CIP sprays or gaskets for sealing the relief gap 20". As shown in FIG. 12, a relief gap 20''' may be formed by forming the drainage column 2 to have a fully inserted sleeve 27 that extends downwardly from the upper part 9 and past the top portion 23 of the lower part 10. Using the fully inserted sleeve 27 also prevents the relief gap 20''' from being exposed to outside of the drainage column 2.

"Relief gap" may, for all embodiments herein including relief gap 20', 20" and 20''', be defined as a section of the drainage column 2 where the inner cross-sectional area of the drainage column 2 increases from the upper part 9 to the lower part 10 of the drainage column 2.

Figure 13:
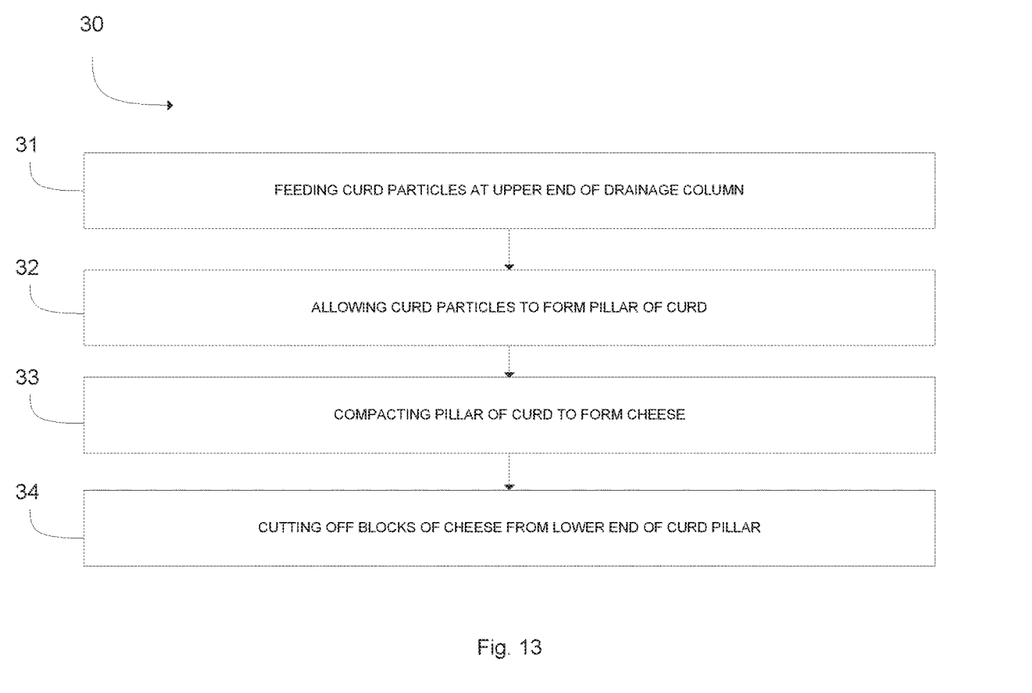
FIG. 13 is a flow chart of a method of producing blocks of cheese using the block former shown in FIG. 1.

Referring now to FIG. 13, a method 30 of producing blocks of cheese 19 by using the block former 1 is shown. The method 30 includes a step 31 of feeding the particles of curd 4 to the upper end 5 of the drainage column 2 of the block former 1 using vacuum transport air. The feed opening 3 is arranged on the top of the drainage column 2 to assure a constant whey level during the production of cheese. The vacuum device 13 is connected to the space 12 for filling the drainage column 2 with the curd particles 4 via the feed opening 3 under reduced pressure. The drainage column 2 is filled with curd, but the whey level is always above the level of curd to avoid air entering the curd. When the block former 1 is full, the feed opening 3 may be closed using a valve. The hopper or feed opening 3 may contain two level control systems for the whey and curd, a pressure indicator, and an overflow gauge that assures that the level in the drainage column 2 is constant.

Step 32 of the method 30 is allowing the particles of curd 4 to form the pillar of curd 8. The vacuum device 13 then causes a vacuum in the space 12 which receives whey that is drained from the pillar of curd 8 as the pillar of curd 8 descends through the drainage column 2. Step 33 of the method 30 is compacting the pillar of curd 8 to form cheese by consolidating and draining the pillar of curd 8 of using the vacuum device 13 and static pressure in the drainage column 2. The whey is drained off in perforated sections at different levels within the lower part 10 of the drainage column 2. Draining is performed using a pressure difference between the curd and whey mixture inside the drainage column 2 and the whey outside of the drainage column 2. The pressure difference may be predetermined as a recipe parameter for the block former 1. As the pillar of curd 8 becomes more compact, the pressure difference may increase and more whey is drained.

The pillar of curd 8 descends through the upper part 9 and the lower part 10 of the drainage column 2 toward the cutting-off device 14 located at the bottom end 15 of the lower part 10, as schematically shown in FIG. 7. The cutting-off device 14 may be used to close the drainage column 2 and the cutting-off device 14 may be in the form of a horizontal guillotine blade. Any other suitable closing element may also be used. The vacuum may be released and the block former 1 may be opened at the bottom end 15 to move the guillotine blade aside at predetermined times. A dosing chamber may also be arranged under the block former 1 and another vacuum may be generated in the dosing chamber. The dosing chamber may include a moveable dosing plate on which the pillar of curd 8 rests at a pre-set height for cutting the cheese.

When the pillar of curd 8 has been transformed into a pillar of cheese 16, step 34 of the method 30 is cutting off the lower end 17 of the pillar of curd 8 from the remaining pillar of curd 8 using the cutting-off device 14. The pillar of curd 8 may rest on the horizontal guillotine blade and the cheese may be cut at predetermined intervals. The underside of the drainage column 2 may be re-closed. The severed block may then be pre-pressed in a pre-pressing chamber between a supporting platform of the block former 1 and the cutting-off device 14, while concurrently new curd chips or particles 4 are fed to the upper end 5 of the drainage column 2. The discharge device 18 may then be used to discharge the block of cheese 19 from the pre-pressing chamber to be packaged and processed downstream. The method 30 is advantageous in that it can be used for cheese where each of the blocks of cheese 19 have at least one of a weight percent of moisture that is equal to or less than 31%, a weight percent of salt content that is equal to or greater than 2%, and a weight percent of fat content that is equal to or less than 25%. Thus, the block former and method of cheese production described herein enable the production of uniform and well-formed blocks of different types of cheeses. According to an aspect of the invention, a block former for the production of blocks of cheese includes an upright drainage column having a feed opening for curd particles at an upper end of the drainage column. The drainage column includes an inner wall having an interior surface against which a pillar of curd formed of the curd particles slides as the pillar of curd moves downwardly through the drainage column. The upright drainage column is divided into an upper part and a lower part. The interior surface at the upper part has a first finish and the interior surface at the lower part has a second finish that provides higher friction with the pillar of curd relative to the first finish.

The lower part of the drainage column may form more than half of the drainage column.

The lower part of the drainage column may form 60% to 70% of the drainage column.

The second finish may be a shot-peened finish.

The second finish may have a surface finish roughness between 2.65 micrometers and 2.80 micrometers.

The second finish may provide at least 15% higher friction against the pillar of curd than the first finish.

The first finish may have a surface finish roughness between 0.75 micrometers and 0.90 micrometers.

The upper part may have an inner cross-sectional area that is less than an inner cross-sectional area of the lower part.

The upper part may transition into the lower part over a distance that is less than 10% of the height of the upper part.

The block former may further include a closed casing that surrounds the inner wall, wherein a space is defined between the casing and the inner wall, and a vacuum device connected to the space for filling under reduced pressure the drainage column with curd particles via the feed opening and creating a vacuum in the space.

The block former may further include a cutting-off device at an end of the lower part for cutting off blocks of cheese from a lower end of the pillar of curd that has been transformed into cheese, and a discharge device for discharging a cut-off block of cheese.

The block former may further include a relief gap formed in the inner wall at a location at which the upper part and the lower part meet to enable sliding of the pillar of curd against the interior surface of the inner wall.

The block former may further include a spray device, a bottom portion of the upper part may be inserted into a top portion of the lower part, the relief gap may be formed adjacent an area in which the upper part and the lower part overlap, and the spray device may be attached to the drainage column and configured to spray the area in which the relief gap is formed.

According to another aspect of the invention, a method of producing blocks of cheese by using the block former may include feeding curd particles at an upper end of the drainage column, allowing the curd particles to form a pillar of curd that moves downwardly through the drainage column, gradually compacting the pillar of curd to form cheese at a lower end of the block former, and cutting off blocks of cheese at the lower end of the block former.

The method of producing blocks of cheese may further include forming each of the blocks of cheese to have at least one of a weight percent of moisture that is equal to or less than 31%, a weight percent of salt content that is equal to or greater than 2%, and a weight percent of fat content that is equal to or less than 25%.

While the invention has been described with reference to one or more preferred features, which features have been set forth in considerable detail for the purposes of making a complete disclosure of the invention, such features are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention.

The invention claimed is:

1. A block former for the production of blocks of cheese, the block former comprising
    an upright drainage column having a feed opening for curd particles at an upper end of the drainage column, the drainage column including an inner wall having an interior surface against which a pillar of curd formed of the curd particles slides as the pillar of curd moves downwardly through the drainage column,
    the drainage column being divided into an upper part and a lower part, wherein the interior surface of the upper part and the lower part form a continuous contact surface with the pillar of curd as the pillar of curd moves downwardly through the drainage column from the upper part to the lower part,
    wherein the interior surface at the upper part has a first finish that has a first coefficient of friction, the interior surface at the lower part has a second finish that is different than the first finish and has a second coefficient of friction, and the second coefficient of friction is higher than the first coefficient of friction,
    wherein the second finish is a shot-peened finish that is formed using a micropeening treatment process, has a greater surface roughness than the first finish and provides higher friction with the pillar of curd relative to the first finish,
    whereby a sliding motion of the pillar of curd falls through the upper part of the drainage column at a rate that is greater than a rate at which a sliding motion of the pillar of curd falls through the lower part of the drainage column.

2. The block former according to claim 1, wherein the lower part of the drainage column forms more than half of the drainage column.

3. The block former according to claim 2, wherein the lower part of the drainage column forms 60% to 70% of the drainage column.

4. The block former according to claim 1, wherein the second finish has a surface finish roughness between 2.65 micrometers and 2.80 micrometers.

5. The block former according to claim 1, wherein the second finish provides at least 15% higher friction against the pillar of curd than the first finish.

6. The block former according to claim 1, wherein the first finish has a surface finish roughness between 0.75 micrometers and 0.90 micrometers.

7. The block former according to claim 1, wherein the upper part has an inner cross-sectional area that is less than an inner cross-sectional area of the lower part.

8. The block former according to claim 1, wherein the upper part transitions into the lower part over a distance that is less than 10% of the height of the upper part.

9. The block former according to claim 1, further comprising:
    a closed casing that surrounds the inner wall, wherein a space is defined between the casing and the inner wall; and
    a vacuum device connected to the space for filling under reduced pressure the drainage column with curd particles via the feed opening and creating a vacuum in the space.

10. The block former according to claim 1, further comprising:
    a cutting-off blade at an end of the lower part for cutting off blocks of cheese from a lower end of the pillar of curd that has been transformed into cheese, wherein a cut-off block of cheese is discharged from the block former.

11. The block former according to claim 1, further comprising a relief gap formed in the inner wall at a location at which the upper part and the lower part meet to enable sliding of the pillar of curd against the interior surface of the inner wall.

12. The block former according to claim 11, further comprising a spray device, wherein a bottom portion of the upper part is inserted into a top portion of the lower part, the relief gap being formed adjacent an area in which the upper part and the lower part overlap, and the spray device is attached to the drainage column and configured to spray the area in which the relief gap is formed.

13. A method of producing blocks of cheese by using the block former according to claim 1, the method comprising feeding curd particles at an upper end of the drainage column, allowing the curd particles to form a pillar of curd that moves downwardly through the drainage column, gradually compacting the pillar of curd to form cheese at a lower end of the block former, and cutting off blocks of cheese at the lower end of the block former.

14. The method according to claim 13, further comprising forming each of the blocks of cheese to have at least one of:
    a weight percent of moisture that is equal to or less than 31%,
    a weight percent of salt content that is equal to or greater than 2%, and
    a weight percent of fat content that is equal to or less than 25%.

15. The method according to claim 1, wherein the upper part and the lower part of the upright drainage column are arranged upstream a location where the pillar of curd is cut into blocks of cheese.

* * * * *